Patented Dec. 5, 1950

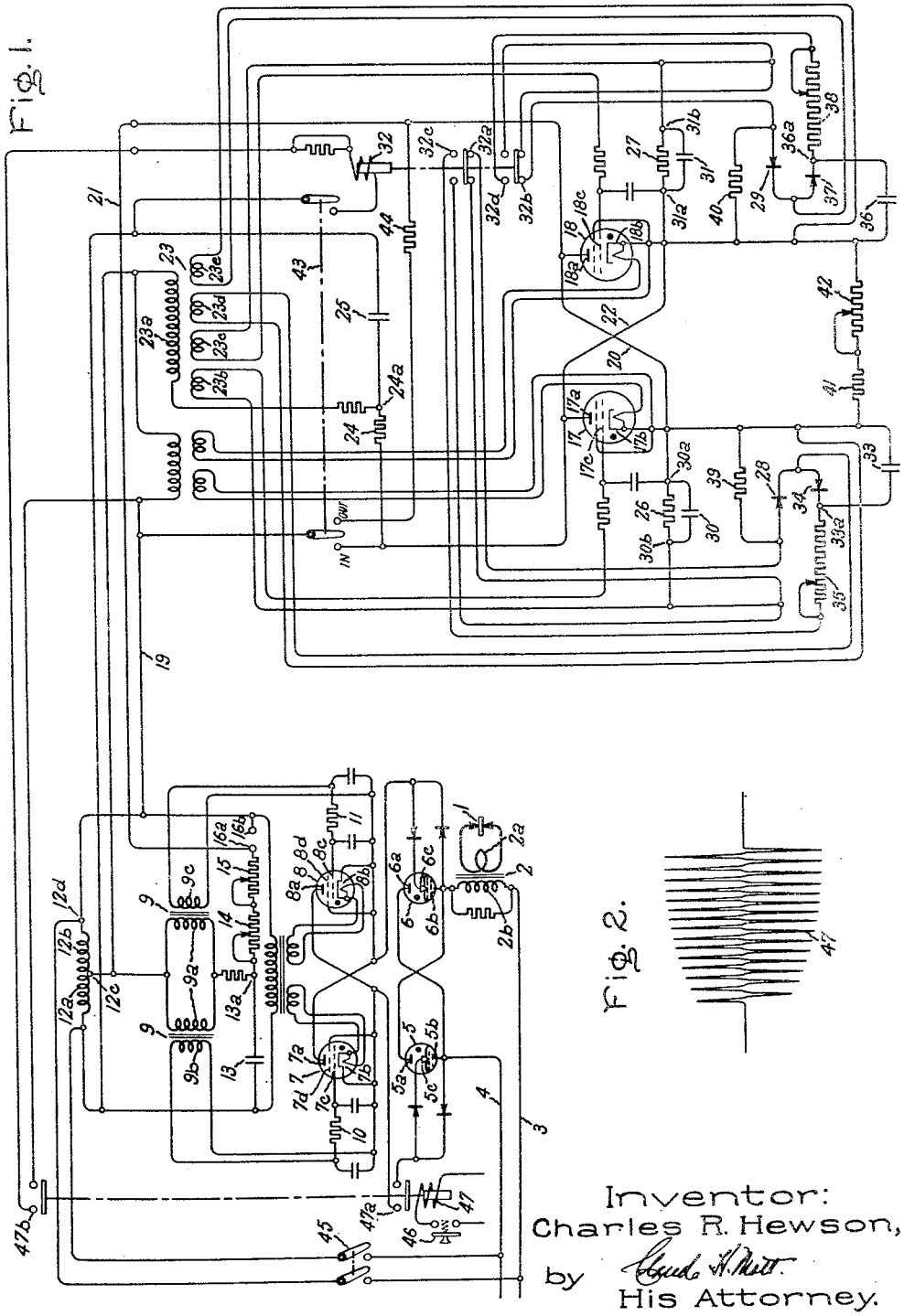

2,532,826

UNITED STATES PATENT OFFICE 2,532,826

WELDING CONTROL SYSTEM

Charles R. Hewson, Altamont, N. Y., assignor to General Electric Company, a corporation of New York Application July 27, 1949, Serial No. 107,127

3 Claims. (Cl. 323—24)

This invention relates to welding control systems, more particularly to resistance welding control systems, and it has for an object the provision of a simple, reliable and inexpensive control system for improving the quality of a weld.

A further object of the invention is the suppression of sparking and sputtering with a corresponding reduction in hazard to the operator.

The invention is especially useful and advantageous in the welding of aluminum alloys but it is not limited to such use.

Modern resistance spot welding and seam welding controls are usually provided with means for setting a fixed value for the intensity of the welding current and for maintaining the current at that value during the process of the weld. If the weld current and the electrical resistance of the weld remain constant during the weld then the rate of generated heating of the weld, i. e. the B. t. u.'s generated per second in the weld remain constant. However, as the temperature of the weld rises, heat losses owing to conduction, convection and radiation increase. As a result, the rate of temperature rise diminishes as the weld progresses and a longer "on" time is required for making the weld. This increase of the "on" time is undesirable for several reasons. It entails a waste of time, a waste of electrical energy and in addition it is likely that the quality of the weld will be impaired. It is possible in some cases that a condition of equilibrium is attained in which the total heat loss equals the rate of heat generation, in which case, if the equilibrium temperature is below the temperature of fusion, the weld will never be accomplished.

Actually the electrical weld resistance is not constant but either increases or decreases toward the end of the weld. Owing to the relatively high reactance of the welding circuit, the change in resistance has a negligible effect on the magnitude of the welding current. Consequently the levelling off of the temperature described in the foregoing and its attendant undesirable effects are aggravated.

The disadvantages described in the foregoing are overcome by beginning the weld at the minimum permissible value of starting current which is relatively low but sufficient to break down the oxides on the surface of the material being welded and then causing the welding current to rise to a maximum value in a predetermined but adjustable number of cycles of the line voltage.

In carrying the invention into effect in one form thereof, a current rise control system is provided in the form of an attachment to existing welding control systems which comprise a pair of ignitrons through which current is conducted from a source of alternating voltage to a load circuit, together with an operator's initiating switch and a phase shifting network including a heat control rheostat for controlling the ignitrons to determine the magnitude of the current supplied to the welding circuit. The attachment comprises a pair of thyratrons which are connected in inverse parallel with each other and in series with the heat control rheostat, together with a separate grid voltage control unit for each thyratron. Each of these units includes a bias capacitor connected between the cathode and grid of the associated thyratron and a charging circuit for applying a charge of proper polarity to cause the capacitor to apply a negative bias voltage to the grid to bias the thyratron beyond cut-off. An auxiliary capacitor is precharged to the opposite polarity. A relay which is responsive to operation of the initiating switch disconnects the bias capacitor from its charging circuit and connects it to the auxiliary capacitor to effect a smooth discharge of the bias capacitor and recharge in the reverse polarity. This causes the thyratrons and the ignitrons to fire earlier in each succeeding cycle to increase the current supplied to the welding circuit at a rate determined by the setting of a "rise time" rheostat in circuit with each of the auxiliary capacitors until the welding current attains the maximum value determined by the setting of the heat control rheostat. An adjustable rheostat in parallel with the thyratrons determines the starting value of the welding current.

Referring now to the drawing, in which Figure 1 represents the system embodying my invention and Figure 2 the graphic illustration of the current supplied to the circuit, a welding load 1 is connected in a series circuit with the secondary winding 2a of a welding transformer 2 of which the primary winding 2b is connected across the A.-C. supply conductors 3 and 4 through a pair of reversely connected ignitron valves 5 and 6. These ignitron valves have anodes 5a and 6a, mercury pool cathodes 5b and 6b, and igniter electrodes 5c and 6c, respectively.

The firing of the ignitron valves is controlled by means of a pair of firing valves 7 and 8. These firing valves are thyratrons of the FG95 type. They apply ignition current to the igniters at the proper point in the positive half cycle of anode voltage to cause current of the desired value to be supplied through the ignitrons to the welding transformer. As shown, the thyratrons 7 and 8 have anodes 7a and 8a, indirectly heated cathodes 7b and 8b, control grids 7c and 8c, and shield grids 7d and 8d, respectively. Control of the exact instant of firing in each positive half cycle of the anode voltages of the ignitrons is provided by control of the voltages supplied to the control grids 7c and 8c of the firing valves.

For the purpose of supplying an alternating voltage to the control grids 7c and 8c to render the firing valves conducting and thereby to fire the ignitrons during the positive half cycles of anode voltage, a transformer 9 is provided. It has a primary winding 9a and two secondary windings 9b and 9c. The secondary winding 9b is connected between the cathode 7b and the control grid 7c through a protective resistor 10 and similarly the secondary winding 9c is connected between the cathode 8b and the control grid 8c through a protective resistor 11.

Alternating voltage is supplied to the primary winding 9a from a phase shifting bridge network which in turn is supplied from the alternating voltage supply conductors 3 and 4. The opposite halves 12a and 12b of a center tapped auto transformer winding constitute two of the arms of the bridge network. The capacitor 13 constitutes the third arm of the bridge and the series connected rheostats 14 and 15 constitute the fourth arm when a jumper is connected between the points 16a and 16b.

The primary winding 9a of the grid circuit transformer is connected between the midtap 12c of the winding 12a, 12b and the junction point 13a of the capacitor 13 and rheostat 14.

Shifting of the phase relationship of the voltages supplied to the control grids 7c and 8c with respect to the anode voltages of the firing valves 7 and 8 and the ignition valves 5 and 6 is employed to produce control of the exact instant of firing of the ignitrons and thereby to vary the value of the current conducted thereby. When the grid voltages of the firing valves are in phase with the anode voltages, the ignitrons are fired early in the positive half cycle of anode voltage and conduct maximum current. When the grid voltages of the firing valves are 180 degrees out of phase with the anode voltages, the ignitrons are not fired at any time during the positive half cycle of anode voltage and conduct zero current. For intermediate values of phase relationship between the grid and anode voltages of the firing valves, the ignitrons conduct corresponding intermediate values of current. Thus by shifting the phase relationship the current which flows through the ignitrons is varied as desired and the welding heat applied at the welding load 1 is correspondingly varied. The phase relationship of the grid and anode voltages of the firing valves is accomplished by adjustment of the rheostat 15 in the phase shifting network. Since adjustment of this resistor controls the current conducted by the ignitrons and the heat applied to the weld, it is referred to as the heat control rheostat. In commercial welding machine controls, the heat control rheostat is manually adjustable and is provided with a calibrated scale so that an operator may readily adjust it to effect a welding heat which, through experience, he knows to be the most satisfactory for the welding conditions confronting him.

For the purpose of increasing the welding current from the starting value to the final value set on the heat control rheostat, there is provided a pair of electric valves 17 and 18. These valves may be of any suitable type. Preferably ther are GL-502-A shield grid thyratrons. As shown, they are provided with anodes 17a and 18a, cathodes 17b and 18b and control grids 17c and 18c. The jumper between the points 16a and 16b is removed and the thyratrons are connected in series with the heat control rheostat and in reverse parallel with each other. That is to say, the anode 17a is connected directly to cathode 18b and the anode 18a is directly connected to cathode 17b. Thus during the half cycle of alternating voltage in which the voltage at the terminal 12d of the autotransformer is positive, and with the disconnect switch closed in the "in" position, a circuit may be traced from terminal 12d through conductor 19, anode 17a, cathode 17b, conductor 20, conductor 21, rheostats 15 and 14, primary windings 9a to midtap 12c. In the succeeding half cycle the circuit is traced from the midtap 12c through the primary windings 9a, the rheostats 14 and 15 and conductor 21, anode 18a, cathode 18b and conductors 22 and 19 to terminal 12d.

A 90 degree lagging alternating bias voltage is supplied between the cathode and grid of each of the thyratrons by means of a phase shifting network and a grid transformer 23 supplied therefrom. The phase shifting network comprises a resistor 24 and a capacitor 25 connected in series relationship with each other across the two sections 12a and 12b of the autotransformer winding. The transformer 23 has a secondary winding 23b which is connected betweeen the cathode 17b and the control grid 17c and another secondary winding 23c which is connected between the cathode 18b and the control grid 18c. Bias resistors 26 and 27 are connected between cathodes 17b and 18b and the secondary windings 23b and 23c, respectively. The primary winding 23a of the grid transformer is connected between the center tap 12c of the autotransformer winding and the junction point 24a of the resistor 24 and capacitor 25. The resistor 24 and the capacitor 25 are so chosen that the alternating voltages which are supplied to the grids 17c and 18c lag the voltages supplied to the anodes 17a and 18a approximately 90 electrical degrees.

The grid transformer is provided with two additional secondary windings 23d and 23e which together with rectifiers 28 and 29 and capacitors 30 and 31 supply negative bias voltages to the grids 17c and 18c. The capacitors 30 and 31 are connected in parallel with the grid circuit resistors 26 and 27, respectively. One terminal of the secondary winding is connected to the terminal 30a of the capacitor 30 and the terminal 30b of the capacitor is connected through the normally closed contacts 32a of relay 32 and rectifier 28 to the opposite terminal of the secondary winding. The rectifier 28 is poled so that the capacitor 30 charges positive at the terminal 30a and negative at the terminal 30b. Thus in the standby condition a negative bias voltage is supplied to the grid 17c and a similar negative bias voltage is supplied to the control grid 18c as a result of the charge placed upon the capacitor 31 by the voltage which is supplied to it through the rectifier 29 from the secondary winding 23e.

For the purpose of supplying a smoothly increasing positive bias voltage to the grid 17c, a capacitor 33 and a rectifier 34 are provided. They are connected in series across the secondary winding 23d, and the rectifier 34 is poled to produce a charge on the capacitor which is positive at the terminal 33a. A rheostat 35 is connected from the terminal 33a through a normally open contact 32c of relay 32 to the terminal 30b of the bias capacitor 30. Similarly, a capacitor 36 and a rectifier 37 connected in series across the secondary winding 23e provide for supplying an increasing positive bias voltage to the grid 18c. A rheostat 38 is connected from the terminal 36a through the normally open contacts 32d of relay 32 to the grid terminal 31b of capacitor 31.

When the relay 32 is picked up it opens its contacts 32a and 32b and closes its contacts 32c and 32d. The opening of contacts 32a and 32b removes the source of negative charge from capacitors 30 and 31 and the closing of contacts 32c and 32d completes circuits for discharging the capacitors 30 and 31 and for causing the capacitors 33 and 36 to charge the capacitors 30 and 31 in the opposite polarity, i. e. positive at the terminals 30b and 31b. The rate of charge of capacitors 30 and 31 is determined by the setting of rheostats 35 and 38. Thus, the setting of the rheostats 35 and 38 determines the time or the number of cycles of the line voltage within which the direct bias voltages applied to grids 17c and 18c become sufficiently positive to cause the thyratrons 17 and 18 to fire full on. Consequently the setting determines the number of cycles required for the welding current supplied by the ignitrons to rise from the starting value to the final value. For this reason these rheostats are referred as as the "cycles to final heat" rheostats and one of them may be provided with a dial calibrated in cycles from starting heat to final heat.

Loading resistors 39 and 40 are connected across the bias supply windings 23d and 23e, respectively. The resistor 39 is of slightly smaller ohmic value than the resistor 40. This has the result that the thyratron 17 is initially biased slightly less negative than the thyratron 18 and will therefore be the first to fire after the relay 32 is picked up.

A resistor 41 and a rheostat 42 are connected in series with each other from the cathode 17b of thyratron 17 to the cathode 18b of thyratron 18. The starting current supplied by the ignitrons 5 and 6 to the welding circuit is determined by the setting of the rheostat 42. For this reason it is referred to as the starting heat rheostat.

A switch 43 serves to remove the thyratrons 17 and 18 from the circuit and to replace them by a resistor 44 which produces the same voltage drop as that produced by the thyratrons when firing full on.

To place the control in operation, the switch 43 is closed to connect the auto transformer winding 12a, 12b to the supply conductors 3 and 4. The starting heat rheostat 42 and the final heat rheostats are then set at the desired values and the switch 43 is moved to the "in" position, thereby to complete the circuit from the anodes 17a and 18a to the autotransformer winding. Also the "cycles to final heat" rheostats are set for the desired rise time, i. e. the number of cycles required for the welding current to rise from the starting value of the final value.

It is usual to provide welding controls with a time delay device to provide a warm-up period for the thyratrons. Such time delay device is omitted from the drawing in the interest of simplicity.

In the standby condition the relay 32 is deenergized and the contacts 32a and 32b are closed to complete charging circuits for capacitors 30 and 31 so that the capacitors receive charges which are positive at the cathode terminals 30a and 31a and negative at the grid terminals 30b and 31b. Thus a negative bias voltage is applied to the grids 17c and 18c which prevents the 90° lagging alternating voltages supplied by secondary windings 23b and 23c from attaining the critical value required to fire the thyratrons at any time during the positive half cycle of anode voltage. As a result the thyratrons 17 and 18 are maintained in the deionized condition.

A welding operation is started by closing the initiating switch 46 to complete an energizing circuit for the operating coil of the control relay 47. In response to energization, the relay 47 closes its normally open contacts 47a and 47b. Contacts 47a in closing prepare the firing circuits for the ignitrons 5 and 6 for completion by conduction of the firing valves 7 and 8.

An alternating voltage appears between the points 12c and 13a of the phase shifting bridge. This voltage is supplied to the primary winding 9a and the voltages induced in the secondary windings 9b and 9c are supplied between the cathode 7b and grid 7c of firing valve 7 and between the cathode 8b and grid 8c of firing valve 8. The phase of these voltages with respect to the anode voltages is determined by the settings of the starting heat rheostat 42 and the final heat rheostat 15. For example, assume that the final heat rheostat 15 is set for 80 per cent of maximum and the starting heat rheostat is set for 50 per cent, the phase of the voltages supplied to the grids of the firing thyratrons is retarded with respect to the anode voltages to provide for firing the ignitrons 5 and 6 at a point in the positive half cycle of anode voltage which will cause 40 per cent of the final maximum current to be supplied to the welding load in the first half cycle of line voltage.

The closing of the contacts 47b completes an energizing circuit for the operating coil of relay 32 which in response to energization opens its normally closed contacts 32a and 32b and closes its normally open contacts 32c and 32d. Contacts 32a and 32b in opening disconnect the bias capacitors 30 and 31 from the secondary windings 23d and 23e. Contacts 32c and 32d in closing connect the capacitors 30 and 31 to the capacitors 33 and 36 which are charged positively at the terminals 33a and 36a. As a result the original charges on the bias capacitors 30 and 31, which were negative at the grid terminals, are removed and the capacitors are recharged in the opposite polarity. Thus the original negative bias voltages on the grids 17c and 18c are gradually made less negative and finally more positive at a rate which is dependent on the setting of the cycles to final heat rheostats 35 and 36.

As this direct bias voltage becomes less negative and more positive, the lagging alternating bias voltages supplied by secondary windings 23b and 23c are gradually raised into the region in which they become more positive than the critical grid voltage and cause the thyratrons 17 and 18 to fire late in the positive half cycle of anode voltage. This has the effect of reducing the effective resistance of the phase shifting bridge between the points 17 and 16b, thereby advancing the phase of the grid voltage of the firing valves 7 and 8 with respect to the anode voltage. This causes the ignitrons 5 and 6 to fire earlier in the positive half cycle of anode voltage, thereby to increase the current in each cycle supplied to the welding load.

As the increase of the direct bias voltages on grids 17c and 18 continues, the thyratrons 17 and 18 fire a little earlier in each positive half cycle of anode voltage until at the end of the charging time of capacitors 30 and 31 the thyratrons are firing throughout the entire cycle, i. e., the positive half cycle of anode voltage for each thyratron, and the maximum effective resistance change in the resistance arm of the phase shifting network has been effected. This has the effect of causing the ignitrons to fire a little earlier in each successive positive half cycle until they are firing at a point in the positive half cycle of anode voltage which results in an effective current in the welding load circuit that corresponds to the setting of the heat control rheostat 16.

The effect of this control is graphically illustrated in Fig. 2 in which the curve 47 represents the current supplied by the ignitrons to the welding circuit. It will be noted that the effective value of this welding circuit current increases gradually from the starting heat value to the final heat value, as indicated by the slope of the envelope. Because of the slope of the envelope the control is referred to as "slope control."

Although in accordance with the provisions of the patent statutes this invention is described as embodied in concrete form and the principle thereof has been explained together with the best mode in which it is now contemplated applying that principle, it will be understood that the elements shown and described are merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States is:

1. For use with a welding control system which comprises a source of alternating voltage, an initiating switch, a pair of ignitron waves and a phase shifting circuit supplied from said source and including a heat control rheostat for controlling said ignitrons to control the magnitude of the current supplied through said ignitrons from said source to a welding load, a welding current rise control system comprising a pair of thyratrons each having an anode, a cathode and a control grid and having their anode-cathode circuits connected in inverse parallel with each other and in series with said rheostat, a capacitor connected in circuit between each of said cathodes and its associated control grid, a grid transformer having a primary winding energized from said source and a separate secondary winding in circuit with each of said capacitors, a separate rectifier in circuit with each of said capacitors poled to charge said capacitors to bias said thyratrons negatively beyond cut-off, a separate auxiliary capacitor connected across each of said secondary windings, a separate rectifier in circuit with each of said auxiliary capacitors and poled to charge said auxiliary capacitors oppositely with respect to the charge on said bias capacitors, and a relay responsive to operation of said initiating switch for disconnecting said bias capacitors from said secondary windings and for reconnecting each of said bias capacitors in circuit with its corresponding auxiliary capacitor thereby gradually to discharge said bias capacitors and to recharge them to the opposite polarity to advance the firing of said ignitrons in each positive half cycle of anode voltage to increase the current supplied to the welding circuit at a predetermined rate.

2. For use with a welding control system which comprises a source of alternating voltage, an initiating switch, a pair of ignitron valves and a phase shifting circuit supplied from said source and including a heat control rheostat for controlling said ignitrons to control the magnitude of the current supplied through said ignitrons from said source to a welding load, a welding current rise control system comprising a pair of thyratrons each having an anode, a cathode and a control grid and having their anode-cathode circuits connected in inverse parallel with each other and in series with said rheostat, a grid transformer energized from said source, a separate grid voltage control unit for each of said thyratrons, each of said units comprising a bias capacitor connected in circuit between the cathode and grid of the associated thyratrons, a charging circuit for said capacitor comprising a secondary winding of said transformer and a rectifier connected in series therewith poled to charge said capacitor to apply a negative voltage to said grid to bias said thyratron beyond cut-off, an auxiliary capacitor and a reversely poled rectifier connected in series across said secondary winding to provide for supplying to said auxiliary capacitor a charge of opposite polarity, a presettable rise time rheostat and a relay responsive to operation of said initiating switch for disconnecting said bias capacitors from said charging circuit and for connecting them through said presettable rheostats to said auxiliary capacitors to discharge said bias capacitors and to recharge them to the opposite polarity thereby to increase the conductivity of said thyratrons and to advance the firing of said ignitrons in each cycle to increase the current supplied to said welding load circuit at a rate dependent on the setting of said presettable rheostats.

3. For use with a welding control system which comprises a source of alternating voltage, an initiating switch, a pair of ignitron valves and a phase shifting circuit supplied from said source and including a heat control rheostat for controlling said ignitrons to control the magnitude of the current supplied through said ignitrons from said source to a welding load, a welding current rise control system comprising a pair of thyratrons each having an anode, a cathode and a control grid and having their anode-cathode circuits connected in reverse parallel with each other and in series with said rheostat, a second phase shifting circuit energized from said source, a grid transformer having a primary winding energized from said second phase shifting circuit, a separate grid voltage control unit for each of said thyratrons, each of said units comprising a bias capacitor having one terminal connected to the cathode of its associated thyratron, a secondary winding of said grid transformer connected between the opposite terminal of said capacitor and the grid of said thyratron for applying to said grid an alternating bias voltage lagging the anode voltage by a substantial phase angle, a charging circuit for said capacitor comprising an additional secondary winding of said grid transformer and a rectifier connected in series therewith and poled to charge said capacitor to apply a negative voltage to said grid to bias said thyratron beyond cut-off, an auxiliary capacitor connected in a circuit across said additional secondary winding, a reversely poled rectifier connected in circuit therewith to provide for applying a charge of opposite polarity to said auxiliary capacitor, and a presettable rise time rheostat; a relay responsive to operation of said initiating switch for disconnecting the bias capacitors of both said units from said charging circuits and for substantially simultaneously connecting them through said rise time rheostats to said auxiliary capacitors to effect discharge of said bias capacitors and recharge to opposite polarity at a predetermined rate determined by the setting of said rise time rheostats to provide for gradual advance of the firing of said thyratrons and said ignitrons thereby to increase the magnitude of the current supplied to said welding circuit at a predetermined rate, and means for presetting the magnitude of the starting current supplied to said welding circuit comprising an adjustable rheostat connected in parallel with said reversely connected thyratrons.

CHARLES R. HEWSON.

(No references cited.)